United States Patent [19]
Steinbuchel, IV et al.

[11] Patent Number: 5,632,372
[45] Date of Patent: May 27, 1997

[54] CONVEYOR TENSIONING ASSEMBLY

[75] Inventors: Herman J. Steinbuchel, IV, Marietta; Steven Brown, Canton, both of Ga.

[73] Assignee: Riverwood International Corporation, Atlanta, Ga.

[21] Appl. No.: 576,074

[22] Filed: Dec. 21, 1995

[51] Int. Cl.$^6$ ................................. B65G 23/44
[52] U.S. Cl. ........................................ 198/813
[58] Field of Search .................... 198/813, 814, 198/815

[56] References Cited

U.S. PATENT DOCUMENTS

| | | | |
|---|---|---|---|
| 2,612,988 | 10/1952 | Andrews | 198/814 |
| 2,893,255 | 7/1959 | Bayliss | 198/814 X |
| 3,599,506 | 8/1971 | Freese | 198/813 |
| 3,687,274 | 8/1972 | Clark et al. | 198/813 |
| 4,995,506 | 2/1991 | Langenbacher et al. | 198/814 |
| 5,156,260 | 10/1992 | Dorner et al. | 198/813 |

Primary Examiner—D. Glenn Dayoan

[57] ABSTRACT

A conveyor tensioning assembly for an article conveyor is mounted to the frame of the article conveyor, and connected to a take-up sprocket. The conveyor tensioning assembly includes a movable rack that is engaged and moved by an advancing gear of an advancing and holding assembly in a first direction, causing the take-up sprocket of the article conveyor to be urged outwardly against the conveyor chain of the article conveyor so as to take-up any slack existing within the conveyor chain and place the conveyor chain under tension. Once the conveyor chain has been tensioned, the rack is engaged by a holding gear mounted on a one-way clutch, which prevents the holding gear from rotating in a counter-clockwise direction. The holding gear retards in any rearward movement of the rack so as to resist slippage and/or backlash of the rack to prevent the chain from losing tension and slack being formed therein to maintain the conveyor chain under a substantially constant tension.

15 Claims, 4 Drawing Sheets

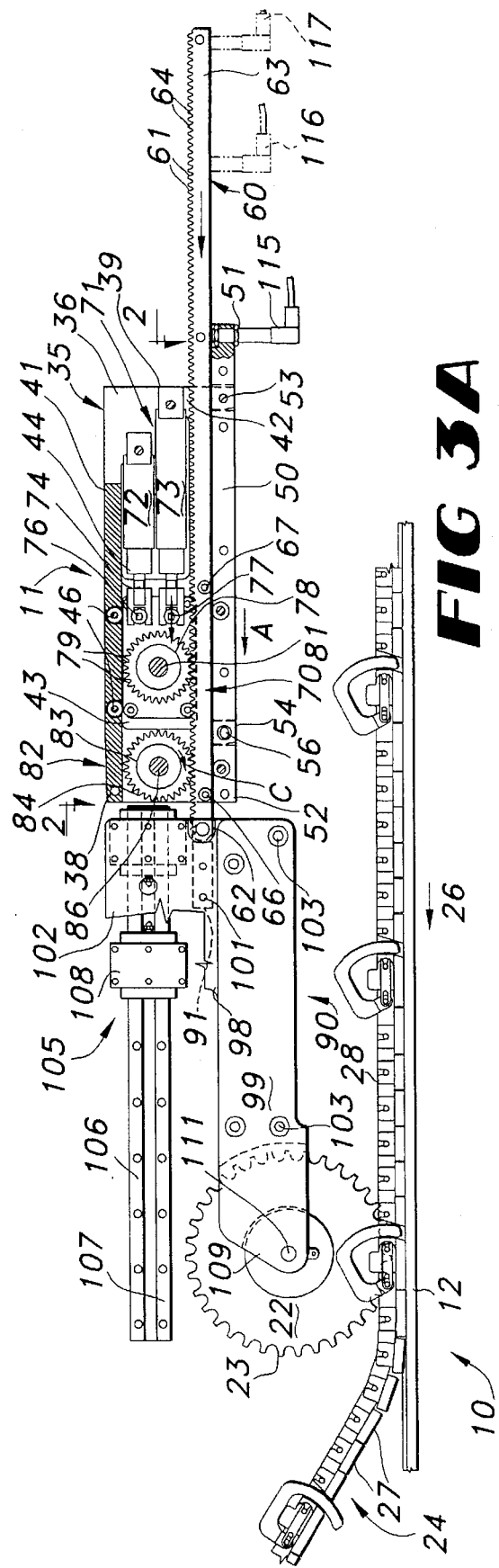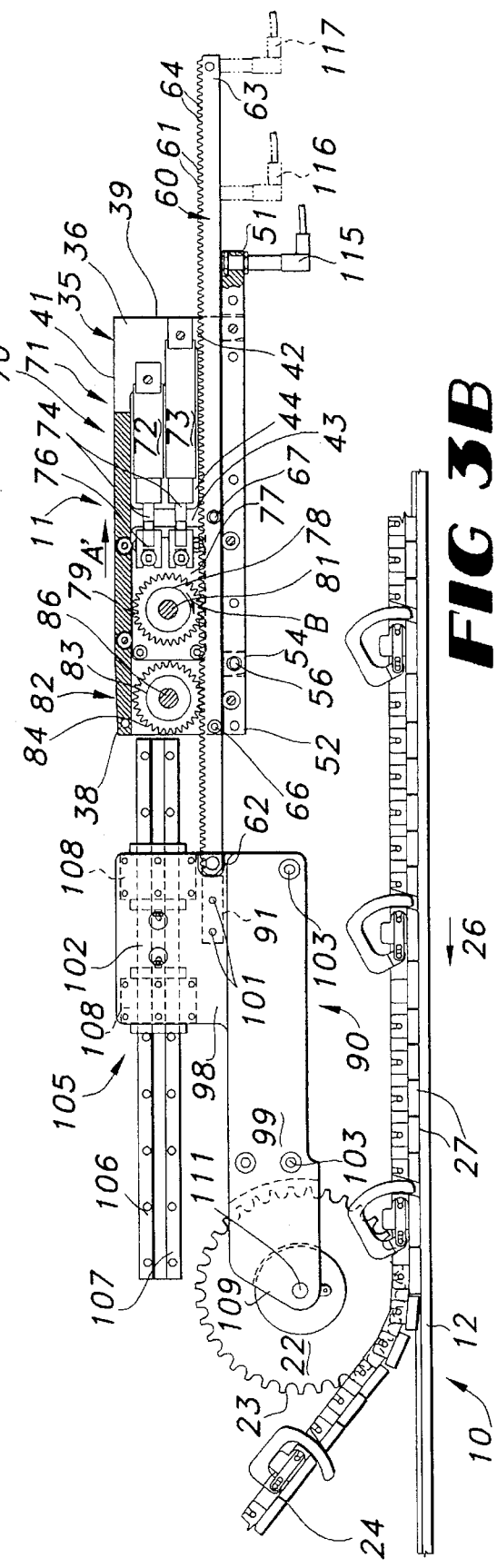

CONVEYOR TENSIONING ASSEMBLY

FIELD OF THE INVENTION

The present invention relates to a tensioning assembly for removing slack from a conveyor chain. In particular, the present invention relates to a conveyor tensioning assembly which includes an advancing gear and a holding gear both mounted on one way clutches and engaging a rack so that as the advancing gear is moved forwardly in a first direction, the rack is urged longitudinally to move a take-up sprocket of the conveyor chain of the conveyor to a tensioning position. After the rack has been moved to its tensioning position by the advancing gear, the rack is engaged and held by the holding gear which is restricted from rotating in a reverse direction by its one-way clutch mounting to prevent backlash or movement of the rack in a rearward direction, which would cause the chain to loosen and slack to be formed therein.

BACKGROUND OF THE INVENTION

In automated operations for the production of goods, such as during the manufacture and packaging of goods, the goods, packaging materials, etc. generally are conveyed along a processing or packaging path on an article conveyor. Such article conveyors typically include a conveyor belt or chain extended about a series of sprockets or rollers in a substantially endless loop. It is important that the conveyor chain or belt be under tension and have no slack therein as the chain is revolved around its conveying path. If slack is present in the conveyor chain, the chain potentially can slip or jump out of engagement with the teeth of the conveyor sprockets, especially where there is a limited engagement between the chain and the drive sprockets of the conveyor. Such jumping or slippage poses a significant danger to the operation of the packaging equipment, potentially disrupting the operation of the equipment or causing misfeeding of the articles, and thus damaging of the articles being conveyed. Overtensioning of the conveyor chain, however, leads to increased wear and reduced life of the conveyor chain, and requiring more often, costly replacement of the conveyor chain. Additionally, as space constraints in plants have increased, requiring reductions in the size of automated production and packaging equipment and article conveyors, the amount of engagement of the conveyor chains with the teeth of their drive and idler sprockets has decreased, increasing the chances of slippage or jumping of the conveyor chains.

To remedy the problems of loose or slack conveyor chains, chain tensioning or take-up devices have been developed for tensioning or taking up the slack of conveyor chains. Typically, such take-up mechanisms have included a ratchet and pawl mechanism that generally comprise a horizontally extending rack, one end of which is connected to a take-up sprocket for the conveyor chain, and a means for moving the rack and take-up sprocket longitudinally to tension and remove slack from the conveyor chain. The rack has a series of teeth formed along its upper edge and which are engaged by a spring loaded pawl as the rack is moved longitudinally. The pawl permits the rack to be moved in a first direction to move the take-up sprocket outwardly to take up any slack existing in the conveyor chain, while generally preventing significant rearward movement of the rack.

An example of such a conventional conveyor take-up or tensioning assembly is illustrated in U.S. Pat. No. 5,038,919 of Harston. The Harston patent generally discloses a conveyor system formed with two parallel, endless chains that carry transversely spaced flights. The conveyor assembly of Harston further includes spring loaded pawls that engage a ratchet bar, forming part of an adjustment means for adjusting the tension in the conveyor chain. An air cylinder is pressurized periodically to pull guide blocks, which support the conveyor chains and about which the conveyor chains are passed, outwardly to increase the tension in the conveyor chains. The engagement of the ratchet bar by the spring loaded pawls is designed to hold the tension in the conveyor chains.

The problem with such conventional take-up assemblies generally is that the tension in the conveyor chain can only be adjusted in discreet steps corresponding to the size of the teeth of the rack. Thus, if the rack is stopped with the pawl halfway between a pair of teeth of the rack, the rack will tend to slip back, commonly referred to as backlash, until the pawl engages a previous tooth recess of the rack. As a result, the conveyor chain at times will be slack when the pawl has slipped back to a previous tooth recess, and at other times will be under tension instead of a consistent tension being maintained on the conveyor chain during its operation.

Accordingly, it can be seen that a need exists for a conveyor tensioning assembly that enables the fine adjustment of tension in a conveyor chain without requiring such adjustment to be performed in finite, discreet steps and in which the potential for backlash of the conveyor chain is avoided to insure that a substantially constant tension is maintained in the conveyor chain.

SUMMARY OF THE INVENTION

Briefly described, the present invention comprises a conveyor tensioning assembly for removing slack from and tensioning a belt or chain of an article conveyor assembly. Typically, the article conveyor includes an elongated, looped chain or belt extended about a series of conveyor sprockets mounted upon a frame. One of the conveyor sprockets functions as a drive sprocket which is rotated to cause the conveyor chain to revolve about the sprockets along a substantially endless looped conveying path. The conveyor tensioning assembly is mounted to the frame of the article conveyor and is connected to a take-up sprocket of the article conveyor for moving the take-up sprocket outwardly to take up any slack in the conveyor chain and place the conveyor chain under tension.

The conveyor tensioning assembly includes a housing mounted to the article conveyor frame and through which a rack is extended, with the rack supported upon and movable along a base pivotally mounted to the housing. The rack generally is an elongated bar formed from a metal such as steel or similar material having a first end, a second end, a flat lower surface that moves along the base, and an upper surface having a series of teeth or serrations formed therein between the first and second ends of the rack. A take-up sprocket for the conveyor chain is connected to the first end of the rack so as to be movable therewith. The rack is movable forwardly in a first direction, substantially parallel to a lower run of the article conveyor to move the take-up sprocket outwardly to take-up existing slack in the conveyor chain and to tension the chain, and is further movable rearwardly in a second direction, opposite its first direction, for lessening the tension in the chain of the article conveyor.

An advancing means is mounted within the housing, positioned above and engaging the rack for moving the rack longitudinally in its first direction. The advancing means generally includes a pair of pneumatic cylinders aligned horizontally, with each cylinder including a piston rod, that is extensible in a direction substantially parallel to the first direction of movement of the rack. The cylinders typically are pulsed for approximately two to ten seconds at a time during normal tensioning operation. The force of the cylinders is sufficient to take up any slack in the chain of the article conveyor assembly, but is insufficient to stretch or over-tension the chain past its maximum limit once the chain has been fully tensioned by the conveyor tensioning assembly.

A slide block is positioned within the housing, attached to the free ends of the piston rods of the air cylinders and supported on rollers mounted within the housing so as to be movable with the extension and retraction of the piston rods. The slide block is attached to the free ends of the piston rods of the air cylinders by fasteners such as bolts, etc. An advancing gear having a series of teeth formed about its circumference, which teeth engage the teeth of the rack, is mounted within the slide block by a one-way clutch. The one-way clutch enables the advancing gear to be rotated so that the teeth move in the direction of the advancing rack, but prevents the reverse rotation of the advancing gear in the direction of the retracting rack. The slide block and advancing gear are moved forwardly in their first direction by the extension of the piston rods of the cylinders. As the slide block and advancing gear are moved forwardly, the teeth of the advancing gear engage the teeth of the rack, with the advancing gear held against rotation by its one-way clutch, to cause the rack to be urged and moved with the advancing gear and slide block forwardly in its first direction.

A holding means is positioned adjacent the advance gear in engagement with the rack. The holding means generally includes a holding gear mounted on a one way clutch so as to be rotatable in the direction of the advancing rack only and having a series of teeth formed about its circumference. The teeth of the holding gear engage and mesh with the teeth of the rack. The holding gear accordingly is rotated in the direction of the advancing rack with the movement of the rack in its first direction by the movement of the advancing gear. When the advancing gear's movement is stopped, the holding gear is locked against rotation in the reverse direction by its one way clutch while the advancing gear is moved rearwardly back to an initial position by the retraction of the piston rods into their cylinders. As a result, the rack, with its teeth in meshing engagement with the teeth of the holding gear, and the take-up sprocket mounted to the first end of the rack are secured in a tensioning position, and rearward movement, or backlash, of the rack in a second direction, opposite its first direction, is retarded to avoid any lessening of tension or the formation of slack within the chain of the article conveyor. Such a locking arrangement avoids potential backlash by the rack, that could cause the chain to be loosened or slackened, especially if the chain was tensioned by air alone.

A carrier is mounted to the first end of the rack so as to move longitudinally with the movement of the rack. The carrier generally includes a pair of spaced carrier plates attached to one another and supported from and movable along a slide means mounted to the frame of the article conveyor. The take-up sprocket of the article conveyor is mounted between and supported by the carrier plates adjacent the first or forwardmost ends thereof. Thus, as the rack is moved forwardly in its first direction by the movement of the advance gear by the pneumatic cylinders of the tensioning assembly, the take-up sprocket likewise is carried forwardly to take up any slack existing within the conveyor chain and place the conveyor chain under tension.

Additionally, a sensor means is mounted to the base support for the rack, positioned along the length of the rack. The sensor means generally comprises an induction type proximity sensor positioned so as to detect the second or trailing end of the rack as the rack is moved longitudinally forward in its first direction. Upon detection of the second or trailing end of the rack, the sensor sends a signal to the machine control to advise the operator that the conveyor chain has been substantially stretched approximately to its maximum limit to prevent possible damage to the chain from being run in a condition stretched beyond pitch limits.

Various objects, features and advantages of the present invention will become apparent to those skilled in the art upon reading the following specification, when taken in conjunction with the accompanying drawings.

BRIEF DESCRIPTION OF THE DRAWINGS

FIGS. 3A–3B are side elevational views, taken in partial cross section, illustrating the operation of the conveyor tensioning assembly of the present invention.

DETAILED DESCRIPTION OF THE PREFERRED EMBODIMENT

Figure 1:
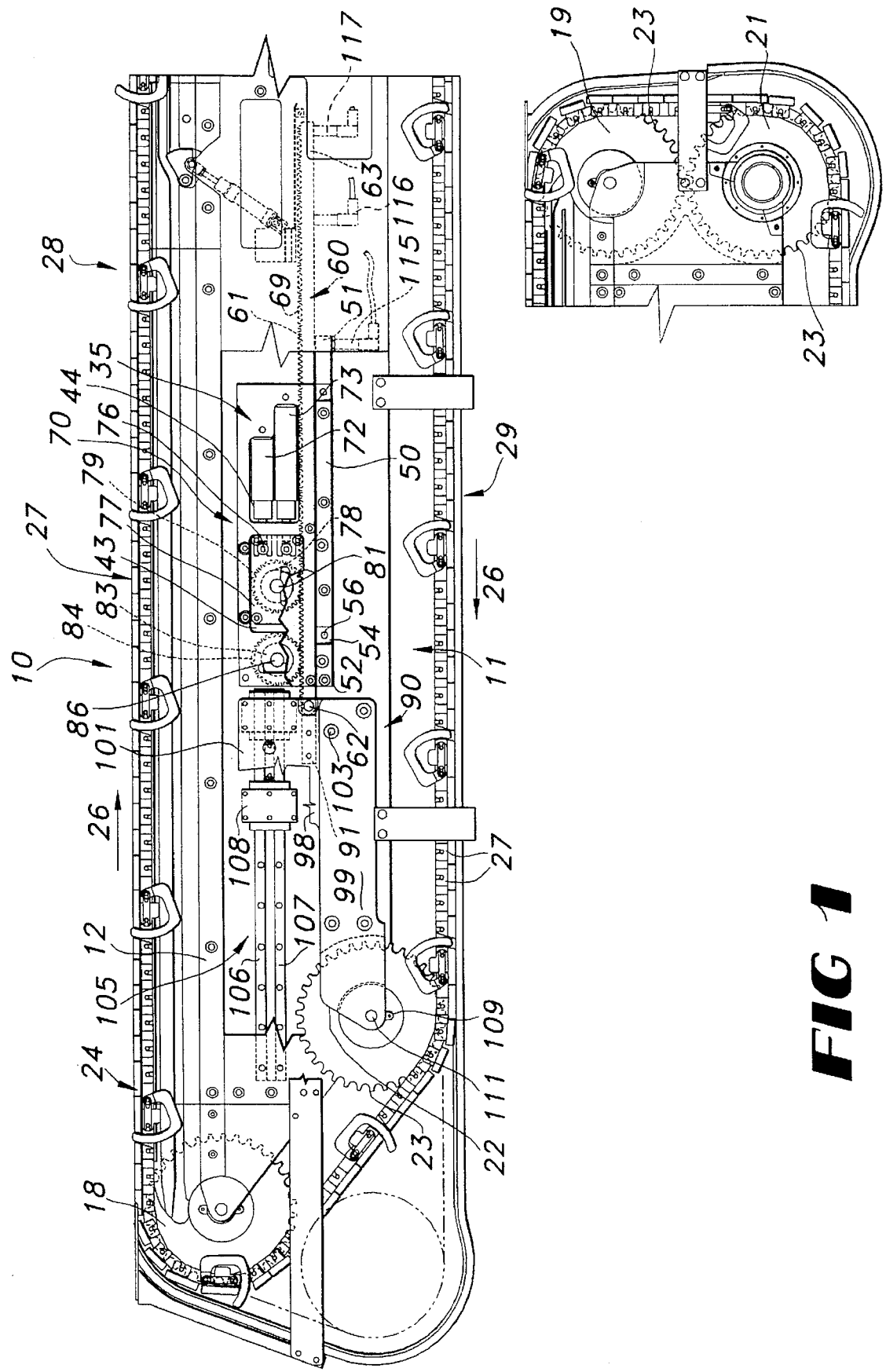
FIG. 1 is a side elevational view, with portions broken away, of the article conveyor having the conveyor tensioning assembly of the present invention mounted thereto.

Referring now in greater detail to the drawings in which like numerals indicate like parts throughout the several views, FIG. 1 illustrates an article conveyor 10 to which the conveyor tensioning assembly 11 of the present invention is mounted. The article conveyor includes an elongated, substantially rectangular conveyor frame 12 having a first end 13, a second end 14 and upper and lower sections 16 and 17. A series of sprockets 18–22 are rotatably mounted to the frame at the corners between the first and second ends 13 and 14 and the upper and lower sections 16 and 17 of the frame 12. Each of the sprockets is a circular plate or gear having a series of teeth 23 formed about its circumference. The teeth of the sprockets engage a conveyor chain 24 to hold the conveyor chain about the conveyor frame 12. Sprocket 21, positioned along the lower section of the frame 12 adjacent the second end 14 is connected to a drive motor or similar means for rotating the sprocket so that the sprocket 21 functions as a drive sprocket for driving a conveyor chain 24 of the article conveyor about a substantially looped conveying path illustrated by arrows 26.

As illustrated in FIG. 1, the conveyor chain 24 generally is a substantially endless-looped chain formed from a series of chain links 27. The conveyor chain 24 is extended about the sprockets 18–22, with the teeth 23 of the sprockets engaging the chain links to hold and move the conveyor chain along its conveying path 26. The conveyor chain moves along its conveying path 26 in the direction of arrows A and A' along an upper run 28 that extends parallel to the upper section 16 of the conveyor frame 12 and a lower run 29 that extends parallel to the lower section 17 of the frame 12. The articles to be conveyed, such as bottles, soft drink cans, etc. are supported on the conveyor chain and are moved along the upper run 28 thereof along the conveying path 26 with the movement of the conveyor chain by its drive sprocket 21 to convey the articles through a processing station such as a packaging machine or similar equipment.

Figure 2:
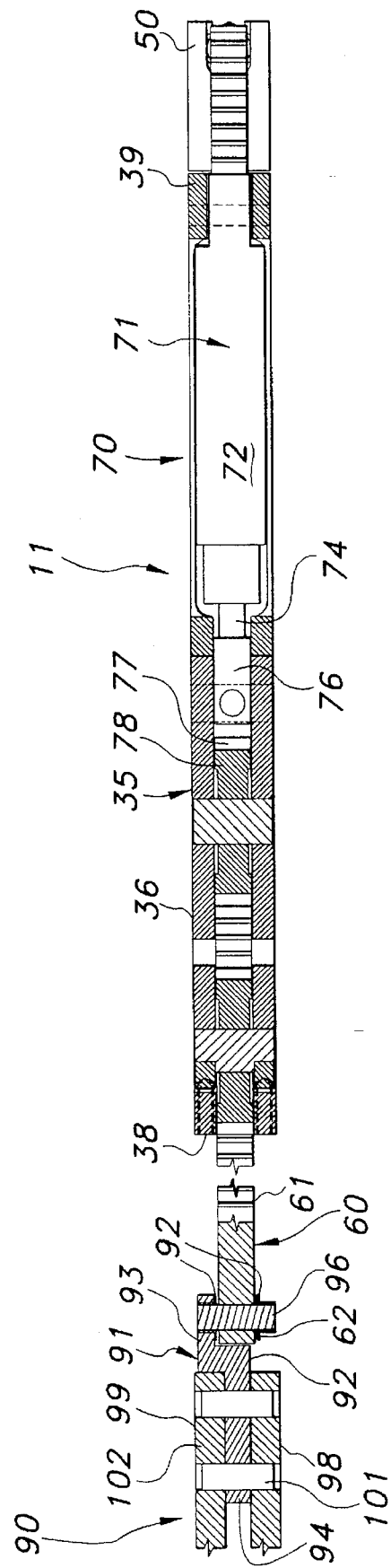
FIG. 2 is a plan view of the housing conveyor tensioning assembly, taken in partial cross section along lines 2—2 of FIG. 3A, illustrating the construction of the housing and advancing means.

As FIG. 1 further illustrates, the conveyor tensioning assembly 11 is mounted to the frame 12 of the article conveyor 10 adjacent its first or forwardmost end 13. The conveyor tensioning assembly includes a housing 35 that mounts to the conveyor frame. The housing is formed from a pair of spaced, substantially rectangularly shaped plates 36 oriented vertically and extending substantially parallel to one another, as illustrated in FIG. 2. The plates each include forward and rearward ends 38 and 39, and upper and lower edges 41 and 42 (FIG. 3A). Cut outs or clearance openings 43 and 44 are formed in the housing plates 36 at intermediate positions between the forward and rearward ends thereof. Each cut-out is a substantially rectangular shaped opening, with the cut-outs of each plate aligned with one another. As illustrated in FIG. 3A, a pair of rollers 46 are mounted to the housing plates, positioned between the upper edges 41 of the housing plates 36 and the upper edge of the forward most cut-outs 43.

Figure 4:
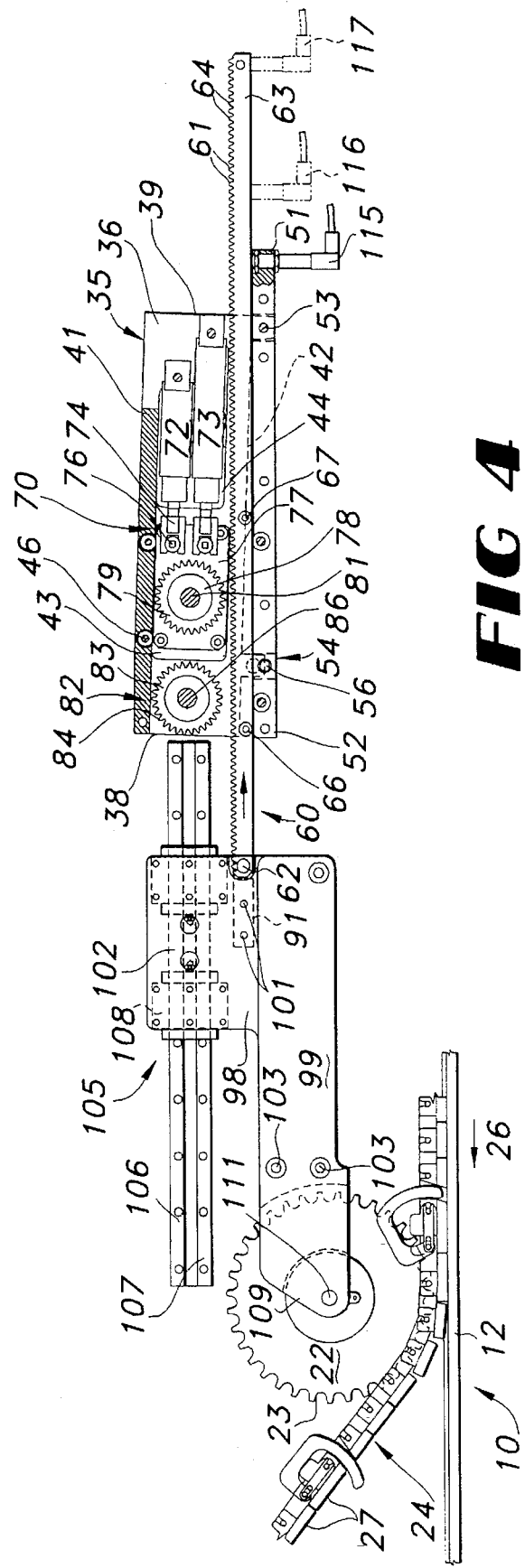
FIG. 4 is a side elevational view schematically illustrating the resetting of the rack to its initial position.

A base 50 is mounted to the lower edges 42 of the housing plates 36 of the housing 35 and positioned within the space. The base generally is a substantially rectangular-shaped beam or member having a rearward end 51 and a forward end 52 and is received and positioned within the space between the opposed, parallel plates of the housing along their lower edges. As illustrated in FIG. 4, the rearward ends 39 of the housing plates are pivotally attached to the base by a pivot pin 53, while the forwardmost ends 38 of the housing plates are releasably attached to the first or forward end 52 of the base 50 by a locking assembly 54. The locking assembly typically includes a spring loaded button 56 or catch that, when in its extended locking position, locks the plates of the housing securely to the base. As the button 56 of the locking assembly 54 is depressed, it disengages the connection between the housing plates and the base to enable the housing to be pivoted upwardly in the direction of arrows B about the pivot pin 53. In the alternative, the locking assembly 54 can comprise a shoulder pin manually inserted through aligned openings formed adjacent the forward end 52 of the base 50 and through the plates of the housing to lock the housing plates and the base together and which releases the housing from engagement with the base when the pin is removed.

The conveyor tensioning assembly 11 further includes a rack 60 that is received between and is movable along the length of the housing plates 36, supported on the base 50. The rack generally is an elongated beam formed from steel or similar durable metal material and has a series of serrations or teeth 61 formed along its length between the ends 62 and 63 of the rack. The rack teeth can either be triangular or rectangular or any other desired configuration and are formed with recesses 64 therebetween. As shown in FIGS. 3A and 3B, rollers 66 and 67 are mounted at spaced positions along the length of the base. The rack is supported on the rollers 66 and 67 of the base 50 so as to be movable in the direction of arrows A and A', substantially parallel to the conveying path 24 (see FIG. 1) for the conveyor chain 23.

FIGS. 3A–3C illustrate an advancing and holding assembly 70 for moving the rack 60 in the direction of arrow A and locking the rack in a set, tensioning position as illustrated in FIG. 3B. The advancing and holding assembly 70 generally includes a cylinder assembly 71, typically including a pair of pneumatic cylinders 72 and 73 mounted within the second or rearmost cutout or clearance openings 44 of the housing 35. The cylinders are positioned one above the other in a vertically stacked, parallel extending arrangement, and typically are of the same pressure, sufficient to take-up any slack and place the conveyor chain approximately under its maximum tension, but which is insufficient to stretch the chain past its maximum tension to avoid stretching or overtensioning the chain. In addition, different pressure cylinders can be used as desired for varying the force applied to the chain to account for changing geometry of the chain during the course of tensioning over the life of the chain, and for adjusting the maximum amount of tension applied by the conveyor tensioning assembly 11. The cylinders 72 and 73 are actuated in a pulse or burst of approximately 2 to 10 seconds, and each includes an extensible piston rod 74. The piston rods and cylinders are extensible in the direction of arrows A upon actuation of the cylinders, and are retracted in an opposite direction, indicated by arrows A', upon deactivation of the cylinders.

The free ends 76 of the piston rods 74 are attached to and support a slide block 77 of the advancing and holding assembly 70. The slide block generally is a substantially rectangular shaped block formed from a metal such as aluminum or steel, or other durable, rigid material that is attached to the free ends of the piston rods so as to be movable in the direction of arrows A and A' with the extension and retraction of the piston rods as shown in FIGS. 3A and 3B. The upper edge of the slide block engages and rolls on the first pair of rollers 46 mounted along the upper edge 41 of the housing as it is moved back and forth in the direction of arrows A and A' by the cylinders 72 and 73.

As illustrated in FIGS. 2–4, an advancing gear 78 is mounted within the slide block 77. The advancing gear comprises a disk having a series of spaced teeth 79 formed about its circumference, which teeth are adapted to engage and mesh with the teeth 61 (FIGS. 3A and 3B) of the rack 60. The advancing gear is mounted on a one way clutch 81 that enables the rotation of the advancing gear in a clockwise direction, as indicated by arrow B, while blocking any rotation in the opposite, counterclockwise direction. Thus, as the slide block and advancing gear are moved forwardly in the direction of arrows A by the pulsing of the cylinders 72 and 73, the one way clutch 81 of the advancing gear holds the advancing gear against rotation as the teeth 79 of the advancing gear engage the teeth 61 of the rack 60, causing the rack to be urged in the direction of arrow A as shown in FIG. 3A.

Once the cylinders of the cylinder assembly have been deactuated and the piston rods 74 thereof are retracted in the direction of arrow A' (FIG. 3B), the slide block is pulled rearwardly in the direction of arrow A' with the retraction of the piston rods 74. The advancing gear also is retracted, rolling along the length of the rack and rotating in the direction of arrow B by its one-way clutch as the slide block and advancing gear are reset to their initial position illustrated in FIG. 3B. Generally, the amount of travel of the slide block per stroke of the piston rods of the cylinders 72 and 73 is approximately 10 millimeters, although the lesser or greater movement or stroke can be provided if so desired. As a result, the rack is moved a discrete amount up to a maximum of approximately 10 millimeters per cycle.

A holding means 82 of the advancing and holding assembly 70 is mounted within the housing 35 forwardly of the slide block 77 and advancing gear 78. The holding means generally comprises a holding gear 83 having radially extending teeth 84 formed about its circumference. The holding gear 83 is mounted adjacent the forward end 38 of the housing 35 with its teeth 84 in meshing engagement with the teeth 61 of the rack 60. The holding gear is mounted on a one way clutch 86 that enables the rotation of the holding gear in a clockwise direction, indicated by arrow C, while restricting the rotation of the holding gear in an opposite, counterclockwise direction. As a result, as indicated in FIG. 3A, as the rack is moved in the direction of arrow A with the forward movement of the slide block and advancing gear by the extension of the piston rod 74 of the cylinder 72 and 73, the holding gear is rotated in the direction of arrow C, permitting the rack to move freely forward. As the cylinders 72 and 73 thereafter are deactuated and their piston rods 74 are retracted in the direction of arrow A' (FIG. 3B), the holding gear is locked in place by its one way clutch mounting 86. Thus, the rack, with its teeth in meshing engagement with the teeth 84 of the holding gear 83, is locked in place by the holding gear and rearward movement of the rack in the direction of arrow A' is prevented. Additionally, the position of the holding gear within the housing 35 can be adjusted vertically with respect to the rack to permit a certain amount of clearance or slack to be retained in the chain if so desired. Such adjustment is accomplished by moving the holding gear vertically away from the rack so that the teeth of the holding gear only partially engage the teeth of the rack to create a slight clearance between the teeth of the rack and the teeth of the holding gear for the running of the conveyor chain with a slight built in clearance.

As illustrated in FIGS. 1–4, a carrier 90 is mounted to the first or forwardmost end 62 of the rack 60, connected thereto by a bracket assembly 91. The bracket assembly 91 (FIG. 2) includes a substantially Z-shaped bracket plate 92 having a first end 93 and a second end 94. The first end 93 attaches to the forwardmost end 62 of the rack by a pin 96 or similar fastener inserted through the rack and first end 93 of the bracket plate 92 and secured therewith by bushings 97. The carrier 90 (FIGS. 1, 3A and 3B) itself is formed from a pair of spaced, parallel plates 98 and 99 attached together along their length by fasteners 101, such as screws or similar fasteners. Carder plate 98 has a substantially L-shaped configuration, including a vertically extending rearward portion 102 to which the bracket plate 92 of the bracket assembly 91 is attached by fasteners 103 such as screws, bolts, or the like. Carrier plate 99 is a generally rectangular shaped plate having substantially the same configuration as the lower portion of carrier plate 98 and is mounted thereto.

The upwardly extending rear portion 102 of carrier plate 98 is mounted to a slide assembly 105 which supports the carrier 90 as it is urged forwardly by the movement of the rack in the direction of arrow A. The slide assembly includes a pair of vertically spaced slide bars 106 and 107 that extend horizontally along the length of the conveyor frame 12 (FIG. 1), parallel to the upper run 28 of the conveyor chain 24. Slide mountings 108 are attached to the upper end of the rear portion 102 of carrier plate 98 and are slidably mounted between the slide bars so as to slide along the length of the slide bars to support the carrier therefrom as the rack moves the carrier in the direction of arrow A. The slide mountings typically comprise reciprocating ball mountings although other types of movable or adjustable mounting means can be used as well.

As shown in FIG. 1, the carrier 90 is attached at its forwardmost end to sprocket 22 of the article conveyor 10. The sprocket 21 functions as a take-up sprocket for taking up or removing slack from the conveyor chain 24 extended thereabout. The take-up sprocket 22 is mounted between the forward or first end 109 of the carrier plates 98 and 99, sandwiched therebetween. The take-up sprocket 22 is mounted to the carrier plate by an axle or pivot pin 111 so as to enable the take-up sprocket to rotate as the conveyor chain is pulled thereabout. The take-up sprocket 22 is moved in the direction of arrow A by the actuation of the cylinders of the advancing and holding assembly, which cause the slide block and advancing gear and thus the rack with its teeth in meshing engagement with the advancing gear, to be moved forwardly so as to urge the carrier in the direction of arrow A. As the carrier is moved outwardly, the take-up sprocket 22 mounted thereto moves against the conveyor chain, causing the conveyor chain to be placed under tension as slack is removed therefrom.

As shown in FIGS. 1 and 3A–4, a sensor 115 is mounted to the second or rear end 116 of the base 50. The sensor typically is an induction type sensor or similar detecting means that is directed upwardly toward the rack 60. The sensor detects the absence of the ferrous metal of the rack such as when the second or rearmost end 63 of the rack 60 has been moved past the rearward end 51 of the base 50 and the sensor 115. Upon detection of the movement of the second or rear end of the rack past the sensor, the sensor sends a signal to the control system for the article conveyor indicating that the conveyor chain has been stretched or tensioned to approximately its maximum limit.

It is further possible to use additional sensors 116 and 117 (shown in phantom in FIG. 1) mounted at spaced intervals upstream from a sensor 115 to detect the rearmost end 63 of the rack at different positions to detect the movement of the rack to selected positions as desired to provide varying amounts or degrees of tension within the conveyor chain. Further, the cylinders of the advancing and holding assembly further can be of different pressure capacities or sizes so as to vary the amount of take up or tension that is placed on the conveyor chain, working in conjunction with the several sensors 115–117 to provide greater control of the amount of tension applied to the chain. In such an arrangement, the cylinders can be actuated independently of each other to provide first and second levels of tensioning, and both can be actuated to provide a third or maximum tensioning of the conveyor chain as desired to account for varying chain geometry during the stroke of the takeup sprocket.

OPERATION

In the operation of the conveyor tensioning assembly 10 (FIGS. 1, 3A–4), for removing the slack from a conveyor chain and placing the conveyor chain under tension as it is moved about an article conveyor 10 (FIG. 1) along a conveying path, the rack 60 initially is in its retracted position as shown in FIGS. 1 and 3A. Thereafter, the cylinders 72 and 73 of cylinder assembly 71 of the advancing and holding assembly 70 are actuated for a pulse or cycle of between approximately 2 to 10 seconds. In response, the cylinders extend their piston rods 74 in the direction of arrows A, causing the slide block and advancing gear 78 to be moved forwardly in the direction of arrows A with the teeth 79 of the advancing gear in meshing engagement with the teeth 61 of the rack 60. The rack accordingly also is moved forwardly in the direction of arrow A by the forward movement of the slide block and advancing gear. As the rack is moved forwardly, the carrier is urged along the slide assembly, carrying the take-up roller 22 therewith. As the take-up roller is moved with the carrier in the direction of arrow A, it pushes against the conveyor chain so that the conveyor chain is tensioned so as to take up and remove any slack existing therein.

At the end of a pulse or cycle, the cylinders are deactuated, causing the piston rods of the cylinders to be retracted in the direction of arrow A' (FIG. 3B). As the piston rods of the cylinders are retracted, the slide block and advancing gear are likewise pulled rearwardly in the direction of arrow A', with the advancing gear rotating in a clockwise direction as indicated by arrow B as it rolls along the length of the rack. The advancing gear and slide block are retracted to their initial, retracted position shown in FIG. 3A to await an additional tensioning operation. At the same time, the teeth of the rack are engaged by the teeth 84 of holding gear 83, which is prevented from rotating in a counterclockwise direction, which would enable the rack to be moved rearwardly in the direction of arrow A', by the one way clutch 86 that mounts the holding gear to the housing 35. Thus, the rack is fixed in place so as to resist backlash or slippage of the rack rearwardly, which would cause an undesirable lessening of the tension in the conveyor chain.

During an initial tensioning operation, at the initial start up of the article conveyor, the slide block and advancing gear are moved along the full stroke of the cylinder, approximately 10 millimeters, during the pulse of the cylinders. The actuation of the cylinder assembly is repeated, again causing the rack and carrier, and thus the take up sprocket, to be moved forwardly in the direction of arrow A to continue to take up any slack remaining in the chain and place the chain under tension. The amount of travel or cycle of the piston rods of the cylinders becomes limited as the tension in the conveyor chain reaches its maximum limit. The force of the cylinders is insufficient to overcome the maximum tension of the conveyor chain such that as the tension is reached, the force of the cylinders becomes substantially balanced by the tension in the conveyor chain to prevent the continued stretching or tensioning of the chain. Thereafter, the conveyor tensioning assembly is deactivated. In use generally, the conveyor tensioning assembly is actuated periodically, such as during the daily start-up of the article conveyor, to take-up slack formed in the conveyor chain during use.

Over time, as the conveyor chain is subjected to wear and stress, etc. during operation, it will tend to loosen and slack will form therein. As slack is formed within the chain, and for example during the start-up of the article conveyor each morning, the conveyor tensioning assembly 11 is actuated prior to the placement of articles on the conveyor to provide a quick adjustment of the tension within the article conveyor at the start of a conveying operation. Additionally, once it has been detected that the chain has worn or stretched to its maximum limit, as when the movement of the second or rearmost end of the rack passes the sensor 115, a signal is sent to the system control for the article conveyor to indicate that the chain has been stretched to its maximum limit.

It accordingly can be seen that the present invention provides a quick, accurate and secure adjustment of the tension within a conveyor chain for an article conveyor with a significant degree of precision, which enables the conveyor chain to be substantially precisely stretched to a desired tension and maintained at such desired tension with danger of backlash and/or slippage, and thus the formation of slack in the chain, being minimized. The present invention further can be installed on new article conveyors or as a retrofit assembly for existing article conveyors for taking up and maintaining tension within the conveyor chains of the article conveyors.

Accordingly, it will be understood by those skilled in the art that while the invention has been disclosed with reference to a preferred embodiment, various advantages and modifications can be made to the invention without departing from the spirit and scope of the invention as set forth in the following claims.

Wherefore, the following is claimed:

1. A tensioning assembly for an article conveyor having a conveyor chain passing about a series of sprockets, said tensioning assembly comprising:

a rack;

means for moving said rack in a first direction, said means for moving said rack being positioned adjacent the rack and including a cylinder assembly mounted adjacent said rack and an advancing member connected to said cylinder assembly and engaging said rack so that as said cylinder assembly moves said advancing member in said first direction said advancing member urges said rack in said first direction:

said advancing member including an advancing gear mounted on a one-way clutch so as to be rotatable in one direction while resisting rotation in an opposite direction;

a carrier mounted to a first end of said rack so as to move with said rack and having a take-up sprocket attached thereto for the conveyor chain such that said take-up sprocket is moved with the movement of said rack to take up slack from the conveyor chain; and holding means mounted along said rack adjacent said means for moving and having a one-way clutch, said holding means adapted to engage said rack and enable said rack to move in said first direction to remove slack from the conveyor chain while retarding movement of said rack in an opposite direction to prevent backlash and slippage of the conveyor chain.

2. The tensioning assembly of claim 1, said cylinder assembly further including a pair of pneumatic cylinders.

3. The tensioning assembly of claim 1 and further comprising a sensor positioned along said rack adjacent said means for moving said rack for detecting a second end of said rack indicating stretch of the conveyor chain.

4. The tensioning assembly of claim 1 and further comprising a support slide mounted above said carrier and along which said carrier is supported and moves to move said take-up sprocket outwardly to a tensioning position.

5. The tensioning assembly of claim 1 and wherein said holding means comprises a holding gear mounted on a one-way clutch so as to be rotatable in one direction while being held against rotation in an opposite direction, said holding gear rotatably engaging said rack to enable movement of said rack in said first direction while resisting movement of said rack in said opposite direction to prevent slipping of the conveyor chain and the forming of slack in the conveyor chain.

6. In an article conveyor system of the type having a frame, a series of sprockets mounted about the frame and a conveyor chain extended about the sprockets and rotated along a conveying path, the improvement therein comprising:

a movable rack mounted to the system frame and connected to a take-up sprocket for the conveyor chain for moving said take-up sprocket outwardly to tension the conveyor chain;

means for moving said rack in a first direction for moving said take-up sprocket to a tensioning position to enable adjustment of the tension in the conveyor chain, said means for moving said rack including a cylinder assembly mounted adjacent said rack and an advancing member connected to said cylinder assembly and engaging said rack so that as said cylinder assembly moves said advancing member in said first direction, said advancing member urges said rack in said first direction;

said advancing member including an advancing gear mounted on a one-way clutch so as to be rotatable in one direction while resisting rotation in an opposite direction; and means for securing said rack against movement in a second direction opposite said first direction, said means for securing being positioned along and in engagement with said rack, said means for securing including a clutch constructed and arranged to resist movement of said rack in said second direction while permitting movement of said rack in said first direction to retard backlash of said rack and maintain the conveyor chain under tension.

7. The system of claim 6 and wherein said clutch comprises a holding gear mounted on a one-way clutch so as to rotate in one direction while being held against rotation in an opposite direction, said holding gear rotatably engaging said rack to enable movement of said rack in said first direction while resisting movement of said rack in said second direction to prevent slipping of the conveyor chain and the forming of slack in the conveyor chain.

8. The system of claim 6 and further including a release means for disengaging both said means for moving said rack and said clutch from said rack to enable said rack to be moved in said second direction to a retracted position.

9. The system of claim 6 and wherein said advancing member further includes a slide plate to which said advancing gear is mounted, said slide plate being mounted to said cylinder assembly so as to be movable in said first and said second directions by said cylinder assembly.

10. The system of claim 6 and further including a series of sensors mounted at spaced intervals along said rack for detecting said rack at varying positions to provide varying amounts of tension in said conveyor chain.

11. In an article conveyor system of the type having a frame, a series of sprockets mounted about the frame and a conveyor chain extended about the sprockets and rotated along a conveying path, the improvement therein comprising:

a movable rack mounted to the system frame and connected to a take-up sprocket for the conveyor chain for moving said take-up sprocket outwardly to tension the conveyor chain;

means for moving said rack in a first direction for moving said take-up sprocket to a tensioning position to enable adjustment of the tension in the conveyor chain;

means for securing said rack against movement in a second direction opposite said first direction, said means for securing being positioned along and in engagement with said rack and including a clutch constructed and arranged to resist movement of said rack in said second direction while permitting movement of said rack in said first direction to retard backlash of said rack and maintain the conveyor chain under tension; and a sensor positioned along said rack in a position for detecting a second end of said rack indicating tensioning of the conveyor chain.

12. A method of tensioning a conveyor chain to remove slack therefrom, said method comprising the steps of:

actuating a cylinder assembly;

engaging and moving a rack in a first direction with an advancing member so as to move a take-up sprocket outwardly;

tensioning the conveyor chain until the tension in the chain substantially balances the force of the cylinder assembly moving the take-up sprocket outwardly; and providing an advancing gear mounted on a one-way clutch rotatable in said first direction only, and rotating said advancing gear on said rack as said rack is moved in said first direction so as to enable the rack to move in said first direction while resisting movement of the rack in an opposite direction once the conveyor chain has been tensioned to prevent backlash of the rack and the forming of slack therein.

13. A method of tensioning a conveyor chain to remove slack therefrom, said method comprising the steps of:

actuating a cylinder assembly;

engaging and moving a rack in a first direction with an advancing member so as to move a take-up sprocket outwardly by moving an advancing gear in said first direction in response to the actuation of the cylinder assembly, said advancing gear engaging and urging the rack in said first direction;

tensioning the conveyor chain until the tension in the chain substantially balances the force of the cylinder assembly moving the take-up sprocket outwardly; and providing a clutch means that engages and rotates as the rack is moved in said first direction to enable the rack to move in said first direction while resisting movement of the rack in an opposite direction once the conveyor chain has been tensioned to prevent backlash of the rack and the forming of slack therein.

14. The method of claim 13 and wherein the step of actuating said cylinder assembly includes the step of pulsing an air cylinder for a desired time.

15. The method of claim 13 and further including the steps of disengaging the clutch means from the rack and moving the rack in a second direction to reset the rack to an initial retracted position in response thereto.

* * * * *